3,545,982
FOODSTUFF WITH PHOSPHATE PEROXIDE
ADDITIVE
Hiromi Nakatani, Kyoto, and Kiyoshi Katagiri, Suita,
Japan, assignors to Takeda Chemical Industries, Ltd.,
Higashi-ku, Osaka, Japan
No Drawing. Filed Feb. 8, 1968, Ser. No. 703,908
Claims priority, application Japan, Feb. 10, 1967,
42/8,671
Int. Cl. A23b 1/01
U.S. Cl. 99—150                                    13 Claims

ABSTRACT OF THE DISCLOSURE

The properties of foodstuff, particularly its preservability, are enhanced by the incorporation thereinto of about 0.01 to about 5% by weight of di(alkali metal) hydrogenphosphate peroxide $$M_2HPO_4 \cdot H_2O_2$$

wherein M is Na or K.

---

The present invention relates to a method for improving foodstuff, to a foodstuff additive usable therein, and to the foodstuff so improved thereby.

Hitherto, hydrogen peroxide, due to its oxidizing and bleaching action, has widely been used as a food additive for the purpose of preservation, sterilization, disinfection or bleaching of foodstuff. However, hydrogen peroxide is unstable in itself and is only available in the form of diluted solution. When concentrated, it is accompanied by danger of explosion. This necessarily gives rise to inconvenience in its use, storage or transportation.

For overcoming this inconvenience, an adduct of hydrogen peroxide to alkali metal pyrophosphate, the adduct being available in a crystalline form, has been employed, and sodium pyrophosphate or potassium pyrophosphate has also been used as a food additive for the same purpose. These are, in practical use, added to foodstuff or foodstuff material (such as kneading products or meat or fish meat, soybean curd (*tofu* in Japanese), soybean paste (*miso* in Japanese), soysauce, noodles, bread, cereal, starch, gluten, cakes, ice cream, sherbet or the like, and drinking water.

It has now been unexpectedly found that a di(alkali metal) hydrogenphosphate, as expressed by the molecular formula:

$$M_2HPO_4 \cdot H_2O_2$$

where M represents Na or K, is not only more effective and of much longer lasting activity but is also more conveniently and more safely used for the above-mentioned purpose than the hitherto-used alkali metal pyrophosphate peroxide. For example, it will be understood from Table I that disodium hydrogenphosphate peroxide has far greater solubility in water and less toxicity in comparison with sodium pyrophosphate peroxide $Na_4P_2O_7 \cdot 2H_2O_2$.

with the pyrophosphate peroxide, the use of di(alkali metal) hydrogenphosphate peroxide does not prejudice the parallel use of the hitherto-employed antiseptic for foodstuff.

Furthermore, while the addition of the pyrophosphate peroxide to bread dough often causes deterioration of bread quality after it is baked, no such ill effect is seen when employing di(alkali metal) hydrogenphosphate peroxide.

Therefore, the principal object of the present invention is to provide a method for preserving foodstuff or ameliorating foodstuff in some qualities thereof by the use of di(alkali metal) hydrogenphosphate peroxide, which is more effective and longer durable in its effect and, in addition, safer and more convenient for the said purpose than prior preservant additives.

Another object of this invention is to provide a solid composition for preserving foodstuff or ameliorating foodstuff in some qualities thereof, the composition being conveniently used as a food additive and being capable of being stored or transported safely and without losing its original activity for a long time.

A further object is to provide foodstuff which is improved in preservability and quality by incorporation of di(alkali metal) hydrogenphosphate peroxide thereinto.

The di(alkali metal) hydrogenphosphate peroxide is produced for example by the reaction of one mole of the corresponding di(alkali metal) hydrogenphosphate with one or two moles of hydrogen peroxide in water or an aqueous solvent, and by concentrating the reaction mixture to dryness by means of evaporation of the solvent under reduced pressure or by spray-drying. More concrete examples of such production follow:

PRODUCTION OF DISODIUM HYDROGEN PHOSPHATE PEROXIDE 50 grams of crystals of disodium hydrogenphosphate and 35 milliliters of a 35% aqueous solution of hydrogen peroxide are dissolved in 50 milliliters of pure water, whereupon reaction takes place. The aqueous reaction mixture is concentrated to dryness under reduced pressure at a temperature not higher than 60° C. The residue is further dried under reduced pressure at 40° C. for 10 hours, and is then crushed to powder.

Calculated for $Na_2HPO_4 \cdot H_2O_2$ (percent): Na, 26.14; P, 17.61; $H_2O_2$, 19.32. Found (percent): Na, 26.03; P, 17.31; $H_2O_2$, 19.50.

PRODUCTION OF DIPOTASSIUM HYDROGEN PHOSPHATE PEROXIDE 174 grams of anhydrous dipotassium hydrogenphosphate and 110 milliliters of a 35% aqueous solution of hydrogen peroxide are dissolved in 500 milliliters of pure water whereupon reaction takes place. The aqueous reaction mixture is then spray-dried in an air stream at 100° C. to give a powdery product.

Calculated for $K_2HPO_4 \cdot H_2O_2$ (percent): K, 37.5; P,

TABLE I

|  | Sodium pyrophosphate peroxide ($Na_4P_2O_7 \cdot 2H_2O_2$) | Disodium hydrogenphosphate peroxide ($Na_2HPO_4 \cdot H_2O_2$) |
|---|---|---|
| The amount of water required to dissolve one gram of the compound, ml | 10.0 | 2.0 |
| Toxicity ($LD_{50}$): |  |  |
| In mice, g./kg | 2.80 | 4.55 |
| In rats, g./kg | 2.25 | 3.6 |

Furthermore, while the use of di(alkali metal) pyrophosphate peroxide often causes lessening or impairment of the effect of other antiseptics such as benzoic acid, propionic acid or sorbic acid which are used in parallel 14.9; $H_2O_2$, 16.3. Found (percent): K, 37.0; P, 14.8; $H_2O_2$, 15.8.

The principal object is realized by incorporating an effective amount of a di(alkali metal) hydrogenphosphate peroxide into foodstuff or foodstuff material or materials, which are intended to be preserved or ameliorated in quality.

As the foodstuff, there are exemplified meat (e.g., meat, flesh of fish, or foods processed therefrom, etc.), foodstuff prepared from beans (e.g., *tofu*, *miso*, soysauce, bean jam, etc.), foodstuff prepared from starch or cereals (e.g., noodles, bread, cake, etc.), ice cream, sherbert or the like, drinks and foodstuff products prepared from greens and fruit, and the like.

The suitable amount of the di(alkali metal) hydrogen phosphate peroxide varies with the kind of foodstuff employed, but is generally between about 0.01 to about 5, preferably about 0.01 to about 3 weight percent in terms of the sodium salt relative to the above-mentioned foodstuff.

More particularly, for example, a more desirable amount of disodium hydrogenphosphate peroxide is about 0.03 to 0.3 weight percent for fish paste, about 0.1 to 0.5 weight percent for meat paste, about 0.2 to 3 weight percent for cheese, about 0.005 to 0.2 weight percent for noodles, about 0.1 to 0.5 weight percent for bread, about 0.05 to 0.2 weight percent for canned peaches or about 0.01 to 0.1 weight percent for pickles. Any other salt than sodium salt is also used on the same molar basis as above. The peroxide, i.e., di(alkali metal) hydrogenphosphate peroxide, can directly be added to foodstuff of its material in a solid form or in a composition form with a suitable carrier such as starch, sugar (e.g., sucrose, lactose or glucose), or proteins (e.g., soya protein, gelatin or casein) as solid carrier and water, ethanol, propylene glycol or a mixture thereof as liquid carrier. Forms of the foodstuff additive can be in a solid state (e.g., powder, granules) or in a liquid state, but the solid additive composition is usually more convenient in practical use and for its storage or transportation.

Depending on the kind of foodstuff or the specific purposes involved, the peroxide or its composition may be applied to the foodstuff by immersing the foodstuff or its material in the liquid composition or by spraying or sprinkling the compound or its composition onto the surface of the foodstuff or its material.

Thus, when the peroxide is applied in the form of composition, the concentration of the peroxide in the composition varies widely with the manner of application to the foodstuff or its material, and is generally chosen between about 1% and about 90% by weight relative to the composition.

Also, other foodstuff additive, such as alkali metal phosphate (e.g., sodium dihydrogenphosphate, sodium polyphosphates, potassium hydrogen metaphosphate, sodium hydrogen pyrophosphate, potassium hydrogen tetraphosphate, etc.) and preservation agents, antioxidant agents, coloring agents, etc., can be suitably used in parallel with the di(alkali metal) hydrogenphosphate peroxide, or as a carrier therefor.

It is to be understood that the following examples are solely for the purpose of illustration and are not intended to be construed as limitations of this invention, and that minor variations may be resorted to without departing from the spirit and scope of this invention. In the said examples, g., ml. and mg. stand for "gram(s)," "milliliter(s)," and "milligram(s)" respectively. Temperatures are all in degrees centigrade and uncorrected; and percentages are all on the weight basis.

Example 1

Samples:
No. 1 _____ Boiled noodles, commercially available (Control).
No. 2 _____ Boiled noodles, commercially available, which have been immersed in a 0.05% aqueous solution of sodium pyrophosphate peroxide for one hour (Control).
No. 3 _____ Boiled noodles, commercially available, which have been immersed in a 0.05% aqueous solution of disodium hydrogen phosphate peroxide for one hour.

Each sample was preserved in a Petri dish under constant conditions of temperature (35° C.) and relative humidity (80%).

The growth of mold on the surface of the samples and the odor of the samples were checked after preservation for 24, 32, 48, 72 and 96 hours. The result is shown in Table II.

TABLE II

| | | Time (hours) | | | | | |
|---|---|---|---|---|---|---|---|
| | | 0 | 24 | 32 | 48 | 72 | 96 |
| Sample: | | | | | | | |
| No. 1 (control) | Mold | − | + | + | + | + | + |
| | Odor | − | + | + | + | + | + |
| No. 2 (control) | Mold | − | − | + | + | + | + |
| | Odor | − | − | + | + | + | + |
| No. 3 | Mold | − | − | − | + | + | + |
| | Odor | − | − | − | + | + | + |

NOTE.—+=mold growth or odor; minus=No mold growth or no odor.

Example 2

No. 1 _____ Soybean curd (*tofu* in Japanese), commercially available, preserved in tap water at 30° C.
No. 2 _____ The same soybean curd, as in No. 1, preserved in a 0.2% aqueous solution of potassium pyrophosphate peroxide in 30° C.
No. 3 _____ The same soybean curd as in No. 1, preserved in a 2.0% aqueous solution of dipotassium hydrogenphosphate peroxide at 30° C.

The growth of mold and development of bad smell or ill taste caused by putrefaction of each of the above samples were checked after preservation for 24, 32, 48, 72 and 96 hours. The result is shown in Table III.

TABLE III

| | | Time (hours) | | | | | |
|---|---|---|---|---|---|---|---|
| | | 0 | 24 | 32 | 48 | 72 | 96 |
| Sample: | | | | | | | |
| No. 1 control | Mold | − | + | + | + | + | + |
| | Rot | − | + | + | + | + | + |
| No. 2 control | Mold | − | − | − | − | + | + |
| | Rot | − | − | − | − | + | + |
| No. 3 | Mold | − | − | − | − | − | + |
| | Rot | − | − | − | − | − | + |

NOTE.—Minus=No mold growth or no development; +=Mold growth or development.

Example 3

A mixture of pork, beef, mutton and beef tallow, in a proportion of 15, 25, 40 and 20 by weight, respectively, is kneaded to obtain a paste. To the kneaded paste is added 0.2 part by weight of sorbic acid, and is admixed. The mixture is again kneaded to prepare a basic meat paste.

Samples:
No. 1 _____ The basic meat paste itself; temperature and constant moisture at 30° C., 80%.
No. 2 _____ The meat paste prepared by incorporating 0.5 part by weight of sodium pyrophosphate peroxide into the basic meat paste.
No. 3 _____ The meat paste prepared by incorporating 0.5 part by weight of disodium hydrogenphosphate peroxide into the basic meat paste.

Each sample was preserved in a Petri dish under constant conditions of temperature (30° C.) and relative humidity (80%).

The growth of mold and development of rotten smell or taste of each of the above samples were checked after preservation for 24, 32, 45, 70 and 95 hours. The result is shown in Table IV.

TABLE IV

| Sample: | | Time (hours) | | | | | |
|---|---|---|---|---|---|---|---|
| | | 0 | 24 | 32 | 45 | 70 | 95 |
| No. 1 control | Mold | − | ± | + | + | + | + |
| | Rot | − | − | + | + | + | + |
| No. 2 control | Mold | − | ± | + | + | + | + |
| | Rot | − | ± | + | + | + | + |
| No. 3 | Mold | − | − | − | ± | + | + |
| | Rot | − | − | − | ± | + | + |

Note.—minus=No mold growth or no development; +=Mold growth or development; ±=Faint mold growth or faint development.

Example 4

The fish meat (flesh) of white croaker was washed with water, dehydrated and minced. To 100 parts by weight of the minced meat were added 3 parts by weight of common table salt, 5 parts by weight of sugar, 5 parts by weight of starch, 0.7 part by weight of monosodium glutamate, 2 parts by weight of *mirin* (a sweet sake), 0.2 part by weight of sorbic acid and 3 parts by weight of water, and the mixture was crushed to prepare a basic crushed meat.

Samples:
- No. 1 _____ The basic crushed meat.
- No. 2 _____ The crushed meat, prepared by incorporating sodium pyrophosphate peroxide into the basic crushed meat.
- No. 3 _____ The crushed meat, prepared by incorporating disodium hydrogenphosphate peroxide into the basic crushed meat.

Each sample was cased with a film of rubber hydrochloride and then heated at 85° to 90° C. for 45 minutes. Each product thus produced was preserved under the same conditions as in Example 1.

The developments of sliminess and of rotten smell of the above samples were checked after preservation for 20, 50, 100, 150 and 200 hours. The result is shown in Table V.

TABLE V

| Sample: | | Time (hours) | | | | | |
|---|---|---|---|---|---|---|---|
| | | 0 | 20 | 50 | 100 | 150 | 200 |
| No. 1 control | Sliminess | − | + | + | + | + | + |
| | Smell | − | + | + | + | + | + |
| No. 2 control | Sliminess | − | − | + | + | + | + |
| | Smell | − | − | + | + | + | + |
| No. 3 | Sliminess | − | − | − | + | + | + |
| | Smell | − | − | − | + | + | + |

Note.—minus=No development; +=Development.

Example 5

3500 parts by weight of glutinous rice was rinsed with water and soaked in water at room temperature overnight. The glutinous rice was then steamed at 100° C. for about 20 minutes, and was made into rice cakes (*mochi* in Japanese), the size of each rice cake being 5 cm. x 5 cm. x 2 cm. Onto the surface of the rice cakes was evenly sprinkled one of the following samples:

| Code No. | Sample | Amount used per rice cake, g. |
|---|---|---|
| I | Corn starch | 2 |
| II | Corn starch containing 5% of $Na_2HPO_4 \cdot H_2O_2$ and 5% of $Na_2H_2P_2O_7$ | 2 |
| III | Mixture of 50% of $Na_2HPO_4 \cdot H_2O_2$ and 50% of $NaH_2PO_4$ | 0.2 |
| IV | $Na_2HPO_4 \cdot H_2O_2$ | 0.1 |
| V | Glucose containing 10% of $Na_2HPO_4 \cdot H_2O_2$ | 1 |

Each rice cake thus treated was sealed in a polyethylene sack, and was preserved at a temperature of about 20° C.

Growth of mold on the surface of the rice cake was checked after preservation for 1, 2, 4, 5, 7, 9, 15 and 19 days. The result is shown in Table VI.

TABLE VI

| Code No.: | Day | | | | | | | |
|---|---|---|---|---|---|---|---|---|
| | 1 | 2 | 4 | 5 | 7 | 9 | 15 | 19 |
| I | − | − | + | + | + | + | + | + |
| II | − | − | − | + | + | + | + | + |
| III | − | − | − | − | − | − | − | − |
| IV | − | − | − | − | − | − | − | − |
| V | − | − | − | − | − | − | − | − |

Note.—Minus=No growth; + = Growth.

Example 6

Boiled noodles (commercial) were homogenized in water to prepare a paste containing 10% of solid part. To the noodle paste, there was added 0.25 weight percent of hydrogen peroxide, sodium pyrophosphate peroxide or disodium hydrogenphosphate peroxide, and each sample thus prepared was preserved at 35° C.

Stabilities of the above mentioned compounds in the noodle paste were observed after preservation for 3, 6 and 9 days. The result is shown in the following Table VII.

TABLE VII

| | Time, days | | |
|---|---|---|---|
| | 3 | 6 | 9 |
| Compound | Compound remained, percent | | |
| $Na_4P_2O_7 \cdot 2H_2O_2$ | 91.0 | 79.5 | 79.5 |
| $Na_2HPO_4 \cdot H_2O_2$ | 100.0 | 100.0 | 100.0 |
| $H_2O_2$ | 92.1 | 92.1 | 92.1 |

What is claimed is:

1. In a method for improving the properties of foodstuff by incorporating therein an effective amount of an improver, the improvement according to which di(alkali metal) hydrogenphosphate peroxide compound is incorporated into the foodstuff in an amount of from about 0.01 to about 5% by weight of the foodstuff, said peroxide compound having the molecular formula $M_2HPO_4 \cdot H_2O_2$ where M represents Na or K.

2. A foodstuff additive, which consists essentially of di(alkali metal) hydrogenphosphate peroxide compound and edible solid carrier for the peroxide compound, the proportion of the peroxide in the additive being about 1 to 90 weight percent, said peroxide compound having the molecular formula $M_2HPO_4 \cdot H_2O_2$ where M is Na or K.

3. A foodstuff of improved preservability, which comprises from about 0.01 to about 5 weight percent of di(alkali metal) hydrogenphosphate peroxide of the molecular formula $M_2HPO_4 \cdot H_2O_2$ where M is Na or K.

4. The method according to claim 1, wherein the alkali metal is sodium.

5. The method according to claim 1, wherein the alkali metal is potassium.

6. The foodstuff additive according to claim 2, wherein the alkali metal is sodium.

7. The foodstuff additive according to claim 2, wherein the alkali metal is potassium.

8. The foodstuff additive according to claim 2, wherein the carrier is starch.

9. The foodstuff additive according to claim 2, wherein the carrier is sugar.

10. The foodstuff additive according to claim 2, wherein the carrier is protein.

11. The foodstuff additive according to claim 2, wherein the additive comprises an alkali metal phosphate.

12. The improved foodstuff according to claim 3, wherein the alkali metal is sodium.

13. The improved foodstuff according to claim 3, wherein the alkali metal is potassium.

References Cited

UNITED STATES PATENTS

| | | | |
|---|---|---|---|
| 2,105,835 | 1/1938 | Krause | 99—220 |
| 2,141,189 | 12/1938 | Lind | 252—186X |
| 2,838,459 | 6/1958 | Sprout | 152—186 |
| 3,140,149 | 7/1964 | Habernickel | 23—14X |
| 3,295,989 | 1/1967 | Matz et al. | 99—90 |
| 3,441,388 | 4/1969 | Knapp et al. | 252—186X |
| 1,866,412 | 7/1932 | Lee | 99—232 |

FOREIGN PATENTS

| | | | |
|---|---|---|---|
| 466,393 | 5/1914 | France | 99—213 |

NORMAN YUDKOFF, Primary Examiner

F. E. DRUMMOND, Assistant Examiner

U.S. Cl. X.R.

99—141, 145, 153, 157, 159, 163, 230, 211; 252—186